United States Patent
Gandelman et al.

(10) Patent No.: US 11,765,103 B2
(45) Date of Patent: Sep. 19, 2023

(54) LARGE-SCALE NETWORK WITH HIGH PORT UTILIZATION

(71) Applicant: MELLANOX TECHNOLOGIES, LTD., Yokneam (IL)

(72) Inventors: Michael Gandelman, Haifa (IL); Jose Yallouz, Kibbutz Shaar Haamakim (IL)

(73) Assignee: MELLANOX TECHNOLOGIES, LTD., Yokneam (IL)

(*) Notice: Subject to any disclaimer, the term of this patent is extended or adjusted under 35 U.S.C. 154(b) by 84 days.

(21) Appl. No.: 17/539,252

(22) Filed: Dec. 1, 2021

(65) Prior Publication Data
US 2023/0171206 A1 Jun. 1, 2023

(51) Int. Cl.
H04L 49/253 (2022.01)
H04L 49/10 (2022.01)
H04L 45/02 (2022.01)
H04L 49/00 (2022.01)

(52) U.S. Cl.
CPC .......... *H04L 49/253* (2013.01); *H04L 45/04* (2013.01); *H04L 49/10* (2013.01); *H04L 49/30* (2013.01); *H04L 49/70* (2013.01)

(58) Field of Classification Search
CPC ....... H04L 49/253; H04L 45/04; H04L 49/10; H04L 49/30; H04L 49/07
See application file for complete search history.

(56) References Cited

U.S. PATENT DOCUMENTS

| | | |
|---|---|---|
| 4,312,064 A | 1/1982 | Bench et al. |
| 6,115,385 A | 9/2000 | Vig |
| 6,169,741 B1 | 1/2001 | Lemaire et al. |
| 6,480,500 B1 | 11/2002 | Erimli et al. |
| 6,532,211 B1 | 3/2003 | Rathonyi et al. |
| 6,553,028 B1 | 4/2003 | Tang et al. |
| 6,614,758 B2 | 9/2003 | Wong |
| 6,665,297 B1 | 12/2003 | Harigochi et al. |
| 6,775,268 B1 | 8/2004 | Wang et al. |

(Continued)

FOREIGN PATENT DOCUMENTS

| | | |
|---|---|---|
| WO | 2012037494 A1 | 3/2012 |
| WO | 2016105446 A1 | 6/2016 |

OTHER PUBLICATIONS

Leiserson, "Fat-Trees: Universal Networks for Hardware Efficient Supercomputing", IEEE Transactions on Computers, vol. C-34, pp. 892-901, Oct. 1985.

(Continued)

*Primary Examiner* — Wutchung Chu
(74) *Attorney, Agent, or Firm* — KLIGLER & ASSOCIATES PATENT ATTORNEYS LTD (57) ABSTRACT

A data communication system includes a plurality of mutually-disjoint sets of switches, each set including multiple mutually-disjoint subsets of the switches in the set. Local links interconnect the switches within each of the subsets in a fully-connected topology, while none of the switches in any given subset are connected in a single hop to any of the switches in any other subset within the same set. Global links interconnect the sets of the switches, each global link connecting one switch in one of the sets to another switch in another one of the sets, such that each of the subsets in any given set of the switches is connected in a single hop by at least one global link to at least one of the subsets of every other set of the switches.

20 Claims, 3 Drawing Sheets

(56) References Cited

U.S. PATENT DOCUMENTS

| | | | |
|---|---|---|---|
| 6,795,886 | B1 | 9/2004 | Nguyen |
| 6,804,532 | B1 | 10/2004 | Moon et al. |
| 6,807,175 | B1 | 10/2004 | Jennings |
| 6,831,918 | B1 | 12/2004 | Kavak |
| 6,912,589 | B1 | 6/2005 | Jain et al. |
| 6,912,604 | B1 | 6/2005 | Tzeng et al. |
| 6,950,428 | B1 | 9/2005 | Horst et al. |
| 7,010,607 | B1 | 3/2006 | Bunton |
| 7,076,569 | B1 | 7/2006 | Bailey et al. |
| 7,221,676 | B2 | 5/2007 | Green et al. |
| 7,234,001 | B2 | 6/2007 | Simpson et al. |
| 7,274,869 | B1 | 9/2007 | Pan et al. |
| 7,286,535 | B2 | 10/2007 | Ishikawa et al. |
| 7,401,157 | B2 | 7/2008 | Costantino et al. |
| 7,590,110 | B2 * | 9/2009 | Beshai ............... H04Q 11/0005 370/375 |
| 7,676,597 | B2 | 3/2010 | Kagan et al. |
| 7,746,854 | B2 | 6/2010 | Ambe et al. |
| 7,899,930 | B1 | 3/2011 | Turner et al. |
| 7,924,837 | B1 | 4/2011 | Shabtay et al. |
| 7,936,770 | B1 | 5/2011 | Frattura et al. |
| 7,969,980 | B1 | 6/2011 | Florit et al. |
| 8,094,569 | B2 | 1/2012 | Gunukula et al. |
| 8,175,094 | B2 | 5/2012 | Bauchot et al. |
| 8,195,989 | B1 | 6/2012 | Lu et al. |
| 8,213,315 | B2 | 7/2012 | Crupnicoff et al. |
| 8,401,012 | B2 | 3/2013 | Underwood et al. |
| 8,489,718 | B1 | 7/2013 | Brar et al. |
| 8,495,194 | B1 | 7/2013 | Brar et al. |
| 8,570,865 | B2 | 10/2013 | Goldenberg et al. |
| 8,576,715 | B2 | 11/2013 | Bloch et al. |
| 8,605,575 | B2 | 12/2013 | Gunukula et al. |
| 8,621,111 | B2 | 12/2013 | Marr et al. |
| 8,625,427 | B1 | 1/2014 | Terry et al. |
| 8,681,641 | B1 | 3/2014 | Sajassi et al. |
| 8,737,269 | B1 * | 5/2014 | Zhou ................. H04L 12/462 370/255 |
| 8,755,389 | B1 | 6/2014 | Poutievski et al. |
| 8,774,063 | B2 | 7/2014 | Beecroft |
| 8,867,356 | B2 | 10/2014 | Bloch et al. |
| 8,873,567 | B1 | 10/2014 | Mandal et al. |
| 8,908,510 | B2 | 12/2014 | Sela et al. |
| 8,908,704 | B2 | 12/2014 | Koren et al. |
| 9,014,006 | B2 | 4/2015 | Haramaty et al. |
| 9,042,234 | B1 | 5/2015 | Liljenstolpe et al. |
| 9,137,143 | B2 | 9/2015 | Parker et al. |
| 9,231,888 | B2 | 1/2016 | Bogdanski et al. |
| 9,264,382 | B2 | 2/2016 | Bogdanski et al. |
| 9,385,949 | B2 | 7/2016 | Vershkov et al. |
| 9,544,185 | B1 | 1/2017 | Yadav et al. |
| 9,548,960 | B2 | 1/2017 | Haramaty et al. |
| 9,571,400 | B1 | 2/2017 | Mandal et al. |
| 9,584,429 | B2 | 2/2017 | Haramaty et al. |
| 9,699,067 | B2 * | 7/2017 | Haramaty ............... H04L 45/14 |
| 9,699,095 | B2 | 7/2017 | Elias et al. |
| 9,729,473 | B2 | 8/2017 | Haramaty et al. |
| 9,876,727 | B2 | 1/2018 | Gaist et al. |
| 9,985,910 | B2 | 5/2018 | Gafni et al. |
| 10,009,277 | B2 | 6/2018 | Goldenberg et al. |
| 10,079,782 | B2 | 9/2018 | Haramaty et al. |
| 10,200,294 | B2 | 2/2019 | Shpiner et al. |
| 10,205,683 | B2 | 2/2019 | Elias et al. |
| 10,218,642 | B2 | 2/2019 | Mula et al. |
| 10,230,652 | B2 | 3/2019 | Haramaty et al. |
| 10,389,646 | B2 | 8/2019 | Zdornov et al. |
| 10,554,556 | B2 | 2/2020 | Haramaty et al. |
| 10,574,546 | B2 | 2/2020 | Levi et al. |
| 10,644,995 | B2 | 5/2020 | Levy et al. |
| 11,005,724 | B1 | 5/2021 | Shpigelman et al. |
| 11,310,163 | B1 | 4/2022 | Lo et al. |
| 2001/0043564 | A1 | 11/2001 | Bloch et al. |
| 2001/0043614 | A1 | 11/2001 | Viswanadham et al. |
| 2002/0009073 | A1 | 1/2002 | Furukawa et al. |
| 2002/0013844 | A1 | 1/2002 | Garrett et al. |
| 2002/0026525 | A1 | 2/2002 | Armitage |
| 2002/0039357 | A1 | 4/2002 | Lipasti et al. |
| 2002/0067693 | A1 | 6/2002 | Kodialam et al. |
| 2002/0071439 | A1 | 6/2002 | Reeves et al. |
| 2002/0085586 | A1 | 7/2002 | Tzeng |
| 2002/0136163 | A1 | 9/2002 | Kawakami et al. |
| 2002/0138645 | A1 | 9/2002 | Shinomiya et al. |
| 2002/0141412 | A1 | 10/2002 | Wong |
| 2002/0165897 | A1 | 11/2002 | Kagan et al. |
| 2002/0176363 | A1 | 11/2002 | Durinovic-Johri et al. |
| 2003/0016624 | A1 | 1/2003 | Bare |
| 2003/0039260 | A1 | 2/2003 | Fujisawa |
| 2003/0065856 | A1 | 4/2003 | Kagan et al. |
| 2003/0079005 | A1 | 4/2003 | Myers et al. |
| 2003/0097438 | A1 | 5/2003 | Bearden et al. |
| 2003/0223453 | A1 | 12/2003 | Stoler et al. |
| 2004/0024903 | A1 | 2/2004 | Costatino et al. |
| 2004/0062242 | A1 | 4/2004 | Wadia et al. |
| 2004/0111651 | A1 | 6/2004 | Mukherjee et al. |
| 2004/0202473 | A1 | 10/2004 | Nakamura et al. |
| 2005/0013245 | A1 | 1/2005 | Sreemanthula |
| 2005/0154790 | A1 | 7/2005 | Nagata et al. |
| 2005/0157641 | A1 | 7/2005 | Roy |
| 2005/0259588 | A1 | 11/2005 | Preguica |
| 2006/0126627 | A1 | 6/2006 | Diouf |
| 2006/0143300 | A1 | 6/2006 | See et al. |
| 2006/0182034 | A1 | 8/2006 | Klinker et al. |
| 2006/0215645 | A1 | 9/2006 | Kangyu |
| 2006/0291480 | A1 | 12/2006 | Cho et al. |
| 2007/0030817 | A1 | 2/2007 | Arunachalam et al. |
| 2007/0058536 | A1 | 3/2007 | Vaananen et al. |
| 2007/0058646 | A1 | 3/2007 | Hermoni |
| 2007/0070998 | A1 | 3/2007 | Sethuram et al. |
| 2007/0091911 | A1 | 4/2007 | Watanabe et al. |
| 2007/0104192 | A1 | 5/2007 | Yoon et al. |
| 2007/0147362 | A1 * | 6/2007 | Beshai ............... H04Q 11/0005 370/388 |
| 2007/0183418 | A1 | 8/2007 | Riddoch et al. |
| 2007/0223470 | A1 | 9/2007 | Stahl |
| 2007/0237083 | A9 | 10/2007 | Oh et al. |
| 2008/0002690 | A1 | 1/2008 | Ver Steeg et al. |
| 2008/0101378 | A1 | 5/2008 | Krueger |
| 2008/0112413 | A1 | 5/2008 | Pong |
| 2008/0165797 | A1 | 7/2008 | Aceves |
| 2008/0186981 | A1 | 8/2008 | Seto et al. |
| 2008/0189432 | A1 | 8/2008 | Abali et al. |
| 2008/0267078 | A1 | 10/2008 | Farinacci et al. |
| 2008/0298248 | A1 | 12/2008 | Roeck et al. |
| 2009/0010159 | A1 | 1/2009 | Brownell et al. |
| 2009/0022154 | A1 | 1/2009 | Kiribe et al. |
| 2009/0097496 | A1 | 4/2009 | Nakamura et al. |
| 2009/0103534 | A1 | 4/2009 | Malledant et al. |
| 2009/0119565 | A1 | 5/2009 | Park et al. |
| 2009/0262741 | A1 | 10/2009 | Jungck et al. |
| 2010/0020796 | A1 | 1/2010 | Park et al. |
| 2010/0039959 | A1 | 2/2010 | Gilmartin |
| 2010/0049942 | A1 | 2/2010 | Kim et al. |
| 2010/0111529 | A1 | 5/2010 | Zeng et al. |
| 2010/0141428 | A1 | 6/2010 | Mildenberger et al. |
| 2010/0216444 | A1 | 8/2010 | Mariniello et al. |
| 2010/0284404 | A1 | 11/2010 | Gopinath et al. |
| 2010/0290385 | A1 | 11/2010 | Ankaiah et al. |
| 2010/0290458 | A1 | 11/2010 | Assarpour et al. |
| 2010/0315958 | A1 | 12/2010 | Luo et al. |
| 2011/0019673 | A1 | 1/2011 | Fernandez |
| 2011/0080913 | A1 | 4/2011 | Liu et al. |
| 2011/0085440 | A1 | 4/2011 | Owens et al. |
| 2011/0085449 | A1 | 4/2011 | Jeyachandran et al. |
| 2011/0090784 | A1 | 4/2011 | Gan |
| 2011/0164496 | A1 | 7/2011 | Loh et al. |
| 2011/0164518 | A1 | 7/2011 | Daraiseh et al. |
| 2011/0225391 | A1 | 9/2011 | Burroughs et al. |
| 2011/0249679 | A1 | 10/2011 | Lin et al. |
| 2011/0255410 | A1 | 10/2011 | Yamen et al. |
| 2011/0265006 | A1 | 10/2011 | Morimura et al. |
| 2011/0299529 | A1 | 12/2011 | Olsson et al. |
| 2012/0020207 | A1 | 1/2012 | Corti et al. |
| 2012/0075999 | A1 | 3/2012 | Ko et al. |
| 2012/0082057 | A1 | 4/2012 | Welin et al. |
| 2012/0144065 | A1 | 6/2012 | Parker et al. |

(56) References Cited

U.S. PATENT DOCUMENTS

| | | |
|---|---|---|
| 2012/0147752 A1 | 6/2012 | Ashwood-Smith et al. |
| 2012/0163797 A1 | 6/2012 | Wang |
| 2012/0170582 A1 | 7/2012 | Abts et al. |
| 2012/0207175 A1 | 8/2012 | Raman et al. |
| 2012/0250500 A1 | 10/2012 | Liu |
| 2012/0250679 A1* | 10/2012 | Judge ............... H04L 49/15 370/359 |
| 2012/0287791 A1 | 11/2012 | Xi et al. |
| 2012/0300669 A1 | 11/2012 | Zahavi |
| 2012/0314706 A1 | 12/2012 | Liss |
| 2013/0044636 A1 | 2/2013 | Koponen et al. |
| 2013/0071116 A1 | 3/2013 | Ong |
| 2013/0083701 A1 | 4/2013 | Tomic et al. |
| 2013/0114599 A1 | 5/2013 | Arad |
| 2013/0114619 A1 | 5/2013 | Wakumoto |
| 2013/0159548 A1 | 6/2013 | Vasseur et al. |
| 2013/0170451 A1 | 7/2013 | Krause et al. |
| 2013/0182604 A1 | 7/2013 | Moreno et al. |
| 2013/0204933 A1 | 8/2013 | Cardona et al. |
| 2013/0208720 A1 | 8/2013 | Ellis et al. |
| 2013/0242745 A1 | 9/2013 | Umezuki |
| 2013/0259033 A1 | 10/2013 | Hefty |
| 2013/0297757 A1 | 11/2013 | Han et al. |
| 2013/0315237 A1 | 11/2013 | Kagan et al. |
| 2013/0322256 A1 | 12/2013 | Bader et al. |
| 2013/0329727 A1 | 12/2013 | Rajagopalan et al. |
| 2013/0336116 A1 | 12/2013 | Vasseur et al. |
| 2013/0336164 A1 | 12/2013 | Yang et al. |
| 2014/0016457 A1 | 1/2014 | Enyedi et al. |
| 2014/0022942 A1 | 1/2014 | Han et al. |
| 2014/0043959 A1 | 2/2014 | Owens et al. |
| 2014/0059440 A1 | 2/2014 | Sasaki et al. |
| 2014/0105034 A1 | 4/2014 | Sun |
| 2014/0140341 A1 | 5/2014 | Bataineh et al. |
| 2014/0169173 A1 | 6/2014 | Naouri et al. |
| 2014/0192646 A1 | 7/2014 | Mir et al. |
| 2014/0198636 A1 | 7/2014 | Thayalan et al. |
| 2014/0211808 A1 | 7/2014 | Koren et al. |
| 2014/0269305 A1 | 9/2014 | Nguyen |
| 2014/0313880 A1 | 10/2014 | Lu et al. |
| 2014/0328180 A1 | 11/2014 | Kim et al. |
| 2014/0343967 A1 | 11/2014 | Baker |
| 2015/0030033 A1 | 1/2015 | Vasseur et al. |
| 2015/0052252 A1 | 2/2015 | Gilde et al. |
| 2015/0092539 A1 | 4/2015 | Sivabalan et al. |
| 2015/0124815 A1 | 5/2015 | Beliveau et al. |
| 2015/0127797 A1 | 5/2015 | Attar et al. |
| 2015/0131663 A1 | 5/2015 | Brar et al. |
| 2015/0163144 A1 | 6/2015 | Koponen et al. |
| 2015/0172070 A1 | 6/2015 | Csaszar |
| 2015/0194215 A1 | 7/2015 | Douglas et al. |
| 2015/0195204 A1 | 7/2015 | Haramaty et al. |
| 2015/0249590 A1 | 9/2015 | Gusat et al. |
| 2015/0295858 A1 | 10/2015 | Chrysos et al. |
| 2015/0372916 A1 | 12/2015 | Haramaty et al. |
| 2016/0012004 A1 | 1/2016 | Arimilli et al. |
| 2016/0014636 A1 | 1/2016 | Bahr et al. |
| 2016/0028613 A1* | 1/2016 | Haramaty ............... H04L 45/14 709/241 |
| 2016/0043933 A1 | 2/2016 | Gopalarathnam |
| 2016/0080120 A1 | 3/2016 | Unger et al. |
| 2016/0080321 A1 | 3/2016 | Pan et al. |
| 2016/0182378 A1 | 6/2016 | Basavaraja et al. |
| 2016/0294715 A1 | 10/2016 | Raindel et al. |
| 2016/0380893 A1 | 12/2016 | Chopra et al. |
| 2017/0054445 A1 | 2/2017 | Wang |
| 2017/0054591 A1 | 2/2017 | Hyoudou et al. |
| 2017/0068669 A1 | 3/2017 | Levy et al. |
| 2017/0070474 A1 | 3/2017 | Haramaty et al. |
| 2017/0180243 A1 | 6/2017 | Haramaty et al. |
| 2017/0187614 A1 | 6/2017 | Haramaty et al. |
| 2017/0195758 A1* | 7/2017 | Schrans ............ H04Q 11/0066 |
| 2017/0244630 A1 | 8/2017 | Levy et al. |
| 2017/0270119 A1 | 9/2017 | Kfir et al. |
| 2017/0286292 A1 | 10/2017 | Levy et al. |
| 2017/0331740 A1 | 11/2017 | Levy et al. |
| 2017/0358111 A1 | 12/2017 | Madsen |
| 2018/0026878 A1 | 1/2018 | Zahavi et al. |
| 2018/0062990 A1 | 3/2018 | Kumar et al. |
| 2018/0089127 A1 | 3/2018 | Flajslik et al. |
| 2018/0139132 A1 | 5/2018 | Edsall et al. |
| 2018/0302288 A1 | 10/2018 | Schmatz |
| 2020/0042667 A1 | 2/2020 | Swaminathan et al. |
| 2020/0067822 A1 | 2/2020 | Malhotra et al. |
| 2020/0136956 A1 | 4/2020 | Neshat |
| 2022/0014607 A1 | 1/2022 | Pilnik et al. |
| 2022/0045972 A1 | 2/2022 | Aibester et al. |
| 2022/0182309 A1* | 6/2022 | Bataineh ............ H04L 47/6275 |

OTHER PUBLICATIONS

Oehring et al., "On Generalized Fat Trees", Proceedings of the 9th International Symposium on Parallel Processing, Santa Barbara, USA, pp. 37-44, Apr. 1995.

Zahavi, "D-Mod-K Routing Providing Non-Blocking Traffic for Shift Permutations on Real Life Fat Trees", CCIT Technical Report #776, Technion—Israel Institute of Technology, Haifa, Israel, pp. 1-7, Aug. 2010.

Yuan et al., "Oblivious Routing for Fat-Tree Based System Area Networks with Uncertain Traffic Demands", Proceedings of ACM Sigmetrics—the International Conference on Measurement and Modeling of Computer Systems, pp. 337-348, San Diego, USA, pp. 337-348, Jun. 2007.

Matsuoka, "You Don't Really Need Big Fat Switches Anymore—Almost", IPSJ SIG Technical Reports, vol. 2003, No. 83, pp. 157-162, year 2003.

Kim et al., "Technology-Driven, Highly-Scalable Dragonfly Topology", 35th International Symposium on Computer Architecture, pp. 77-78, Beijing, China, pp. 77-88, Jun. 2008.

Jiang et al., "Indirect Adaptive Routing on Large Scale Interconnection Networks", 36th International Symposium on Computer Architecture, Austin, USA, pp. 220-231, Jun. 2009.

Minkenberg et al., "Adaptive Routing in Data Center Bridges", Proceedings of 17th IEEE Symposium on High Performance Interconnects, New York, USA, pp. 33-41, Aug. 2009.

Kim et al., "Adaptive Routing in High-Radix Clos Network", Proceedings of the 2006 ACM/IEEE Conference on Supercomputing (SC2006), Tampa, USA, pp. 1-11, Nov. 2006.

Infiniband Trade Association, "InfiniBand™ Architecture Specification vol. 1", Release 1.2.1, pp. 1-1727, Nov. 2007.

Culley et al., "Marker PDU Aligned Framing for TCP Specification", IETF Network Working Group, RFC 5044, pp. 1-74, Oct. 2007.

Shah et al., "Direct Data Placement over Reliable Transports", IETF Network Working Group, RFC 5041, pp. 1-38, Oct. 2007.

Martinez et al., "Supporting fully adaptive routing in Infiniband networks", Proceedings of the International Parallel and Distributed Processing Symposium (IPDPS'03), pp. 1-10, Apr. 2003.

Joseph, "Adaptive routing in distributed decentralized systems: NeuroGrid, Gnutella & Freenet", Proceedings of Workshop on Infrastructure for Agents, MAS and Scalable MAS, Montreal, Canada, pp. 1-11, year 2001.

Gusat et al., "R3C2: Reactive Route & Rate Control for CEE", Proceedings of 18th IEEE Symposium on High Performance Interconnects, New York, USA, pp. 50-57, Aug. 2010.

Wu et al., "DARD: Distributed adaptive routing datacenter networks", Proceedings of IEEE 32nd International Conference Distributed Computing Systems, pp. 32-41, Jun. 2012.

Ding et al., "Level-wise scheduling algorithm for fat tree interconnection networks", Proceedings of the 2006 ACM/IEEE Conference on Supercomputing (SC 2006), pp. 1-9, Nov. 2006.

Prisacari et al., "Performance implications of remote-only load balancing under adversarial traffic in Dragonflies", Proceedings of the 8th International Workshop on Interconnection Network Architecture: On-Chip, Multi-Chip, pp. 1-4, Jan. 2014.

Li et al., "Multicast Replication Using Dual Lookups in Large Packet-Based Switches", 2006 IET International Conference on Wireless, Mobile and Multimedia Networks, pp. 1-3, Nov. 2006.

(56) References Cited

OTHER PUBLICATIONS

Nichols et al., "Definition of the Differentiated Services Field (DS Field) in the IPv4 and IPv6 Headers", Network Working Group, RFC 2474, pp. 1-20, Dec. 1998.
Microsoft., "How IPv4 Multicasting Works", pp. 1-22, Mar. 28, 2003.
Suchara et al., "Network Architecture for Joint Failure Recovery and Traffic Engineering", Proceedings of the ACM Sigmetrics joint international conference on Measurement and modeling of computer systems, pp. 97-108, Jun. 2011.
IEEE 802.1Q, "IEEE Standard for Local and metropolitan area networks Virtual Bridged Local Area Networks", IEEE Computer Society, pp. 1-303, May 19, 2006.
Plummer, D., "An Ethernet Address Resolution Protocol," Network Working Group, Request for Comments (RFC) 326, pp. 1-10, Nov. 1982.
Hinden et al., "IP Version 6 Addressing Architecture," Network Working Group ,Request for Comments (RFC) 2373, pp. 1-26, Jul. 1998.
Garcia et al., "On-the-Fly 10 Adaptive Routing in High-Radix Hierarchical Networks," Proceedings of the 2012 International Conference on Parallel Processing (ICPP), pp. 279-288, Sep. 2012.
Dally et al., "Deadlock-Free Message Routing in Multiprocessor Interconnection Networks", IEEE Transactions on Computers, vol. C-36, No. 5, pp. 547-553, May 1987.
Nkposong et al., "Experiences with BGP in Large Scale Data Centers:Teaching an old protocol new tricks", pp. 1-44, Jan. 31, 2014.
"Equal-cost multi-path routing", Wikipedia, pp. 1-2, Oct. 13, 2014.
Thaler et al., "Multipath Issues in Unicast and Multicast Next-Hop Selection", Network Working Group, RFC 2991, pp. 1-9, Nov. 2000.
Glass et al., "The turn model for adaptive routing", Journal of the ACM, vol. 41, No. 5, pp. 874-902, Sep. 1994.
Mahalingam et al., "VXLAN: A Framework for Overlaying Virtualized Layer 2 Networks over Layer 3 Networks", Internet Draft, pp. 1-20, Aug. 22, 2012.
Sinha et al., "Harnessing TCP's Burstiness with Flowlet Switching", 3rd ACM SIGCOMM Workshop on Hot Topics in Networks (HotNets), pp. 1-6, Nov. 11, 2004.
Vishnu et al., "Hot-Spot Avoidance With Multi-Pathing Over InfiniBand: An MPI Perspective", Seventh IEEE International Symposium on Cluster Computing and the Grid (CCGrid'07), pp. 1-8, year 2007.
NOWLAB—Network Based Computing Lab, pp. 1-2, years 2002-2015, as downloaded from http://nowlab.cse.ohio-state.edu/publications/conf-presentations/2007/vishnu-ccgrid07.pdf.
Alizadeh et al.,"CONGA: Distributed Congestion-Aware Load Balancing for Datacenters", Cisco Systems, pp. 1-12, Aug. 9, 2014.
Geoffray et al., "Adaptive Routing Strategies for Modem High Performance Networks", 16th IEEE Symposium on High Performance Interconnects (HOTI '08), pp. 165-172, Aug. 2008.
Anderson et al., "On the Stability of Adaptive Routing in the Presence of Congestion Control", IEEE Infocom, pp. 1-11, year 2003.
Perry et al., "Fastpass: A Centralized "Zero-Queue" Datacenter Network", M.I.T. Computer Science & Artificial Intelligence Lab, pp. 1-12, year 2014.
Afek et al., "Sampling and Large Flow Detection in SDN", SIGCOMM '15, London, UK, pp. 345-346, Aug. 2015.
Amante et al., "IPv6 Flow Label Specification", Request for Comments: 6437, pp. 1-15, Nov. 2011.
Yallouz et al., U.S. Appl. No. 17/016,464, filed Sep. 10, 2020.
Shpiner et al., "Dragonfly+: Low Cost Topology for Scaling Datacenters", IEEE 3rd International Workshop on High-Performance Interconnection Networks in the Exascale and Big-Data Era (HiPINEB), pp. 1-9, Feb. 2017.
Zahavi et al., "Distributed Adaptive Routing for Big-Data Applications Running on Data Center Networks," Proceedings of the Eighth ACM/IEEE Symposium on Architectures for Networking and Communication Systems, New York, USA, pp. 99-110, Oct. 2012.
MELLANOX White Paper, "The SHIELD: Self-Healing Interconnect," pp. 1-2, year 2019.
Cao et al., "Implementation Method for High-radix Fat-tree Deterministic Source-routing Interconnection Network", Computer Science, vol. 39, issue 12, pp. 33-37, year 2012.
U.S. Appl. No. 17/353,869 Office Action dated Jan. 12, 2023.
U.S. Appl. No. 17/079,543 Office Action dated Mar. 16, 2022.
EP Application #21204582.7 Search Report dated Mar. 18, 2022.
U.S. Appl. No. 17/016,464 Office Action dated May 10, 2022.
Cisco, "Cisco ACI Remote Leaf Architecture—White Paper," pp. 1-83, updated Jan. 22, 2020.
Nkposong et al., "Experiences with BGP in Large Scale Data Centers: Teaching an Old Protocol New Tricks", pp. 1-47, JANOG33 Meeting (Japan Network Operators' Group), Beppu City, Japan, Jan. 23-24, 2014.
Infiniband Trade Association, "Supplement to Infiniband Architecture Specification," vol. 1, release 1.2.1—Annex A17: RoCEv2, pp. 1-23, Sep. 2, 2014.
Infiniband Trade Association, "InfiniBand Architecture Specification," vol. 1, Release 1.5, Jun. 2, 2021, Draft, Table 6 (Base Transport Header Fields), pp. 1-2, year 2021.
Thulasiraman et al., "Logical Topology Augmentation for Guaranteed Survivability Under Multiple Failures in IP-over-WDM Optical Network," 2009 IEEE 3rd International Symposium on Advanced Networks and Telecommunication Systems (ANTS), pp. 1-3, year 2009.
Nastiti et al., "Link Failure Emulation with Dijkstra and Bellman-Ford Algorithm in Software Defined Network Architecture," Abstract of Case Study: Telkom University—Topology, 2018 6th IEEE Conference on Information and Communication Technology (ICoICT), pp. 135-140, year 2018.
Kamiyama et al., "Network Topology Design Considering Detour Traffic Caused by Link Failure," Networks 2008—The 13th International Telecommunications Network Strategy and Planning Symposium, pp. 1-8, year 2008.
Levi et al., U.S. Appl. No. 17/079,543, filed Oct. 26, 2020.
Ronen et al., U.S. Appl. No. 17/353,869, filed Jun. 22, 2021.
Valadarsky et al., "Xpander: Towards Optimal-Performance Datacenters," Proceedings of CoNEXT '16, pp. 205-219, Dec. 2016.
Bilu et al., "Lifts, Discrepancy and Nearly Optimal Spectral Gap*," Combinatorica, vol. 26, No. 5, Bolyai Society—Springer-Verlag, pp. 495-519, year 2006.

* cited by examiner

LARGE-SCALE NETWORK WITH HIGH PORT UTILIZATION

FIELD OF THE INVENTION

The present invention relates generally to data communications, and particularly to high-speed, large-scale computer networks.

BACKGROUND

High-speed computer networks, such as data center networks and High-Performance Computing (HPC) compute-node clusters, comprise switches that are linked together in a selected interconnection topology. Such topologies include, for example, mesh, Fat-Tree (FT) and Dragonfly (DF) topologies. The term "switches" is used broadly in the context of the present description and in the claims to refer to all sorts of network switching nodes, including, without limitation, bridges, and routers.

The Dragonfly topology is described, for example, by Kim et al., in "Technology-Driven, Highly-Scalable Dragonfly Topology," Proceedings of the 2008 International Symposium on Computer Architecture (2008), pages 77-88. U.S. Patent Application Publication 2010/0049942 describes a Dragonfly processor interconnect network that comprises a plurality of processor nodes, a plurality of routers, each router directly coupled to a plurality of terminal nodes, the routers coupled to one another and arranged into a group, and a plurality of groups of routers, such that each group is connected to each other group via at least one direct connection.

As another example, U.S. Pat. No. 9,699,067, whose disclosure is incorporated herein by reference, describes a topology referred to as "Dragonfly Plus." In this topology, a communication network includes multiple nodes, which are arranged in groups such that the nodes in each group are interconnected in a bipartite topology and the groups are interconnected in a mesh topology. The nodes are configured to convey traffic between source hosts and respective destination hosts by routing packets among the nodes on paths that do not traverse any intermediate hosts other than the source and destination hosts.

"Expander" network topologies have been proposed as a more optimal alternative to traditional data center networks, based on principles of graph theory. Topologies of this sort are described, for example, by Valadarsky et al., in "Xpander: Towards Optimal-Performance Datacenters," presented at CoNEXT '16 (December 2016, Irvine, Calif.). The authors show by theoretical computations and simulation that Xpander achieves "near-optimal performance" in terms of throughput, bandwidth guarantees, robustness to traffic variations, resiliency to failures, incremental expandability, and path lengths.

SUMMARY

Embodiments of the present invention that are described hereinbelow provide improved systems and methods for data communications.

There is therefore provided, in accordance with an embodiment of the invention, a data communication system, including a plurality of mutually-disjoint sets of switches, each set including multiple mutually-disjoint subsets of the switches in the set. Local links interconnect the switches in each of the subsets in a fully-connected topology, such that all the switches in any given subset of any given set of the switches are connected by the local links to all other switches in the given subset, while none of the switches in the given subset are connected in a single hop to any of the switches in any other subset within the given set. Global links interconnect the sets of the switches. Each global link connects a respective first switch in one of the sets to a respective second switch in another one of the sets, such that each of the subsets in any given one of the sets of the switches is connected in a single hop by at least one of the global links to at least one of the subsets of every other one of the sets of the switches.

In one embodiment, within each subset of the switches, a first one of the switches in the subset is connected by a first global link to a first one of the switches in a first one of the other sets, and a second one of the switches in the subset is connected by a second global link to a second one of the switches in a second one of the other sets.

Additionally or alternatively, different ones of the subsets in any given one of the sets are connected by respective ones of the global links in single hops to different, respective ones of the subsets of the other sets of the switches.

Further additionally or alternatively, at least some of the subsets in any given one of the sets of the switches are not connected in a single hop by the global links to all the subsets in every other one of the sets of the switches. In one embodiment, each of the subsets in each of the sets of the switches is connected in a single hop by a respective one of the global links to a single respective one of the subsets in every other one of the sets of the switches.

In another embodiment, all the subsets in each of the sets of the switches are connected in a single hop by respective ones of the global links to all the subsets in every other one of the sets of the switches.

In some embodiments, the system includes a routing manager, which is configured to define paths for transmission of packets among the switches in the system over the local and global links, wherein the paths are limited to a predefined maximal number of hops. In a disclosed embodiment, the switches are configured to transmit the packets over the paths using a number of virtual channels that is equal to the predefined maximal number of hops, while transitioning through the virtual channels in a predefined sequence on each hop of each of the paths.

There is also provided, in accordance with an embodiment of the invention, a method for communication, which includes partitioning switches in a network among a plurality of mutually-disjoint sets of switches, each set including multiple mutually-disjoint subsets of the switches in the set. The switches in each of the subsets are interconnected using local links in a fully-connected topology, such that all the switches in any given subset of any given set of the switches are connected by the local links to all other switches in the given subset, while none of the switches in the given subset are connected in a single hop to any of the switches in any other subset within the given set. The sets of the switches are interconnected using global links, such that each global link connects a respective first switch in one of the sets to a respective second switch in another one of the sets, and such that each of the subsets in any given one of the sets of the switches is connected in a single hop by at least one of the global links to at least one of the subsets of every other one of the sets of the switches.

There is additionally provided, in accordance with an embodiment of the invention, a data communication system, including a plurality of mutually-disjoint sets of switches, each set including multiple mutually-disjoint subsets of the switches in the set. Local links interconnect the switches within each of the subsets in a fully-connected topology, while none of the switches in any given subset are connected in a single hop to any of the switches in any other subset within the same set. Global links interconnect the sets of the switches. Each global link connects one switch in one of the sets to another switch in another one of the sets, such that each of the subsets in any given set of the switches is connected in a single hop by at least one global link to at least one of the subsets of every other set of the switches.

The present invention will be more fully understood from the following detailed description of the embodiments thereof, taken together with the drawings in which:

DETAILED DESCRIPTION OF EMBODIMENTS

The cost-effectiveness of a network topology can be measured in terms of its "port utilization," which is defined as PU=num of hosts/num of switches*Radix. The port utilization, in other words, specifies the number of cables that must be used to connect a given number of hosts. As cables are a major factor in the cost of high-speed networks, it is desirable that the port utilization be as high as possible, while still meeting performance requirements in terms of low communication latency and high reliability. Dragonfly topologies are popular in data center networks and HPC clusters because they offer high connectivity and simplicity of routing among network nodes. In comparison with newer topologies, however, such as the above-mentioned "Xpander" topology, Dragonfly networks are inferior in terms of port utilization.

Embodiments of the present invention that are described herein provide novel network topologies that offer low communication latency and ease of routing that are comparable to Dragonfly networks, while achieving much higher port utilization. The present embodiments are based on fully-connected local subsets of the switches in the network, as in Dragonfly networks, but make sparser, more optimal use of global links among these subsets.

In the disclosed embodiments, the switches in a data communication system are partitioned into multiple mutually-disjoint sets, and the switches in each such set are partitioned into multiple mutually-disjoint subsets. Within each subset, local links interconnect the switches in a fully-connected topology, meaning that all the switches in any given subset are connected in a single hop to all other switches in the subset. Within any given set, however, none of the switches in any given subset are connected in a single hop to any of the switches in any other subset within the given set.

The different sets of switches are interconnected by global links, i.e., each global link connects a switch in one of the sets to a switch in another set. The global links are laid out so each of the subsets in any given set of the switches is connected in a single hop by at least one global link to at least one of the subsets of every other one of the sets of the switches. The number and connectivity of the global links are selected so as to optimize port utilization while meeting performance targets such as low transmission latency and high resilience against failures.

The term "hop," as used in the context of the present description and in the claims, refers to a single link between a pair of network devices that is traversed by a packet on its path through the network. In other words, if a packet traverses N nodes on its path through the network (including the source and destination nodes), it will cover N−1 hops. In some embodiments, to achieve high port utilization, at least some of the subsets in a given set of the switches are connected in a single hop by a global link only to certain subsets within the other sets of the switches, but not to all subsets. To maintain low latency and ease of routing, however, a given subset in a given set of the switches may be connected in single hops by global links to multiple subsets of each other set. In one embodiment, each of the subsets of the switches is connected in a single hop by a global link to one of the subsets in every other set of the switches.

Figure 1:
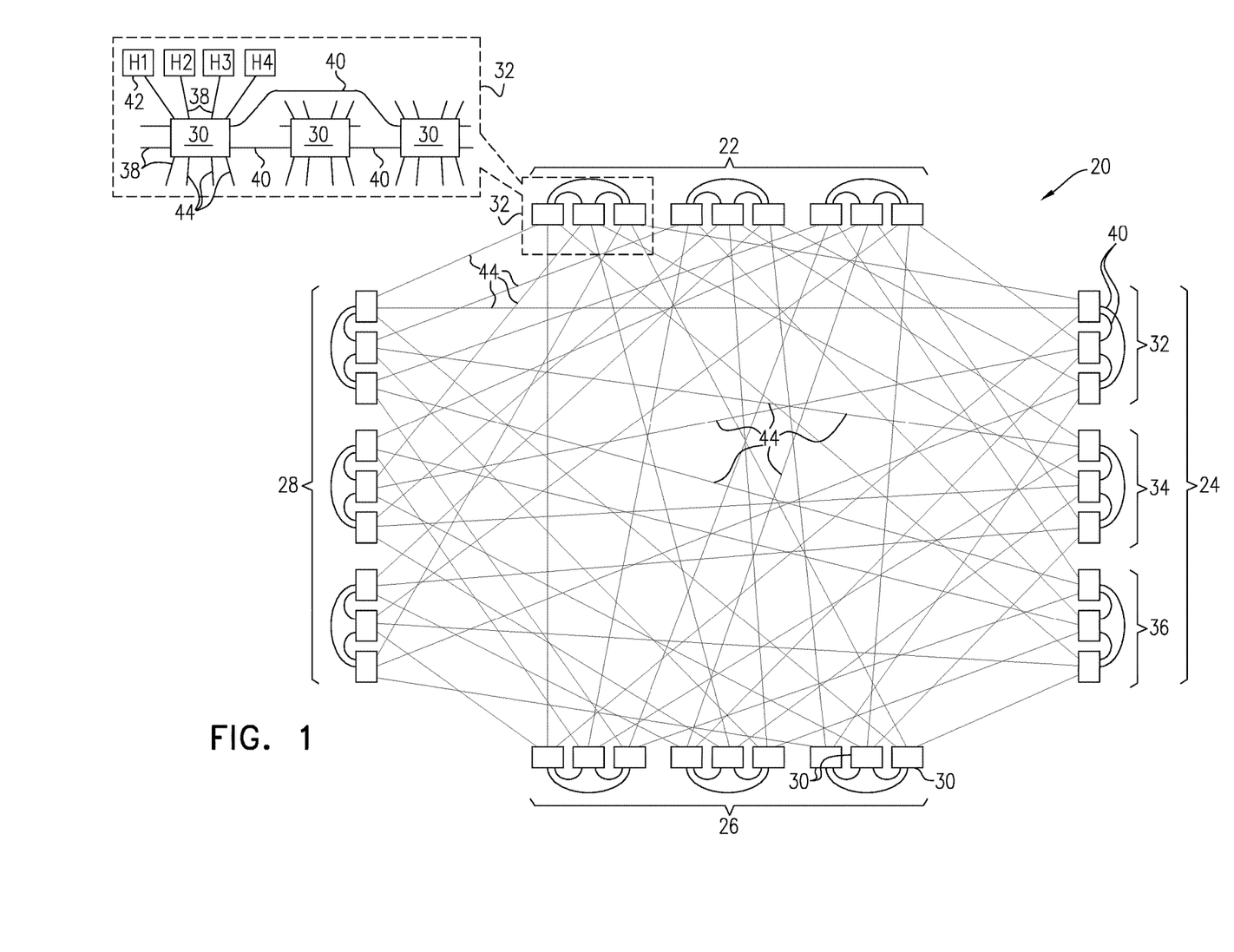
FIG. 1 is block diagram that schematically illustrates a data communication system, in accordance with an embodiment of the invention.
Figure 2:
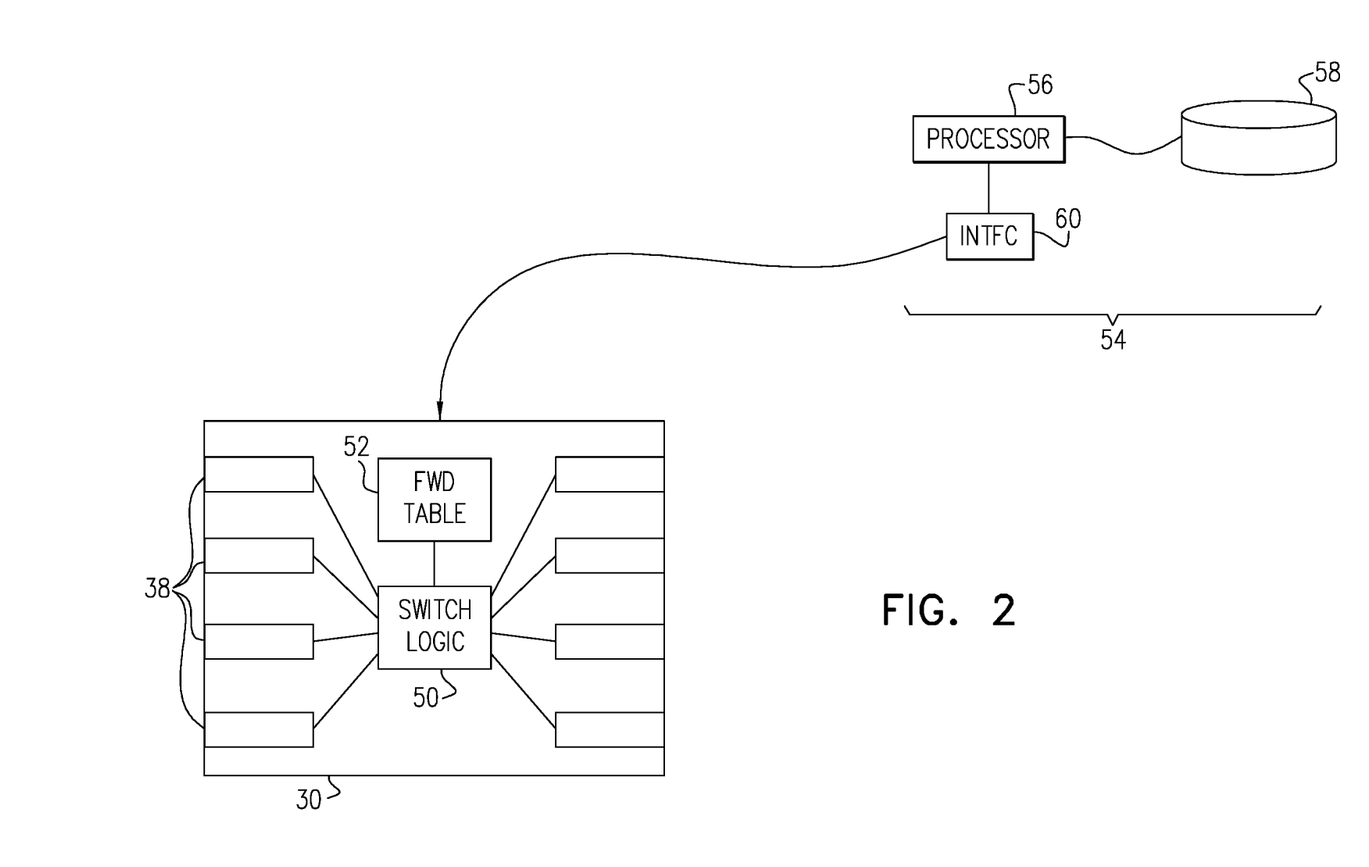
FIG. 2 is a block diagram that schematically shows details of elements of the system of FIG. 1.

Reference is now made to FIGS. 1 and 2, which schematically illustrate a data communication system 20, in accordance with an embodiment of the invention. FIG. 1 is a block diagram showing an overview of the system, while FIG. 2 is a block diagram that schematically shows details of elements of the system.

System 20 comprises a network of switches 30, which are divided into multiple mutually-disjoint sets 22, 24, 26, 28. Each of these sets is divided into a number of mutually-disjoint subsets 32, 34, 36. Although network 20 in this example comprises four sets of switches with three subsets of three switches each in each set, the principles of the present embodiment may similarly be applied to larger or smaller networks, with larger or smaller numbers of switches in each subset (but no less than two switches in each subset) and larger or smaller numbers of subsets in each set. Furthermore, although symmetrical configurations, such as that shown in FIG. 1, in which all the sets and subsets are equal in size, are simpler to implement, in alternative implementations some of the sets and/or subsets may be of different sizes.

As shown in FIG. 2, each switch 30 comprises multiple ports 38, which are interconnected by switching logic 50. Each port 38 typically comprises hardware circuits including physical layer (PHY) and media access control (MAC) interface circuits. Each port 38 connects to a local link 40 or to a global link 44. Links 40 and 44 typically comprises electronic or optical communication cables and/or circuit traces, although they may alternatively comprise wireless links. Some local links 40 connect switches 30 to network end-nodes, such as host computers 42 (labeled H1, H2, H3 and H4 in the inset in FIG. 1). Switching logic 50 receives incoming data packets through ports 38 and transmits the packets out through other ports 38 in accordance with logical instructions, which are stored, for example, in a forwarding table 52. (When switch 30 is configured as a router, forwarding table 52 comprises a routing table and may contain multiple alternative forwarding paths for purposes of adaptive routing.) Although switching logic 50 is shown in FIG. 2 as a simple crossbar connection, in practice switches 30 may comprise more complex switching and routing logic, as well buffer memories.

In each subset 32, 34, 36 of any one of sets 22, 24, 26, 28, local links 40 interconnect switches 30 within the subset in a fully-connected topology, meaning that all the switches in any given subset of any given set of the switches are connected by local links 40 in a single hop to all the other switches in the same subset. On the other hand, none of the switches in any given subset 32, 34 or 36 is connected in a single hop to any of the switches in any other subset within the same set. Thus, for example, in set 24, all of switches 30 in subset 32 are connected by local links 40 to the other switches in subset 32, but none of these switches are connected in a single hop to any of the switches in subsets 34 and 36 of set 24. Therefore, to route a packet from a source in subset 32 in set 24 to a destination in subset 34 in set 24, it is necessary to transmit the packet from subset 32 to a switch in a different set (22, 26 or 28), which then forwards the packet over one or more additional hops to the destination.

Global links 44 interconnect the different sets 22, 24, 26 and 28 of switches 30. Each global link connects a respective switch in one of the sets to a switch in another one of the sets. Global links 44 are arranged such that each of subsets 32, 34 and 36 in any given set of the switches is connected in a single hop by at least one global link 44 to at least one of the subsets of every other one of the sets of the switches. With this minimal level of connectivity, each set 22, 24, 26, 28 will be connected to each other set of the switches by multiple global links 44, each connecting to a different one of the subsets in the set. This topology enables packets to be routed throughout system 20 with high port utilization, as defined above.

Furthermore, in the topology that is shown in FIG. 1, within each subset 32, 34, 36 of any given set, one switch 40 in the subset is connected by a first global link 44 to a switch in one of the other sets, and another switch in the same subset is connected by a second global link 44 to a switch in a different one of the other sets. For example, the leftmost switch 30 in subset 32 of set 22 may be connected to a switch in set 28, while the middle switch in this subset is connected to a switch in set 26, and the rightmost switch is connected to a switch in set 24. Additionally or alternatively, the different subsets 32, 34, 36 in any given set 22, 24, 26, 28 of switches 30 are connected by respective global links 44 in single hops to different, respective subsets of each other set of the switches. These conditions provide a relatively uniform distribution of global links 44 among subsets 32, 34, 36 of all sets 22, 24, 26, 28, which approximates the non-deterministic distribution of links in an Xpander network.

For similar reasons, in some embodiments, at least some of subsets 32, 34, 36 in any given set 22, 24, 26, 28 of switches 30 are not connected in a single hop by global links to all the subsets in every other set of the switches. In one embodiment, each of the subsets in a given set of the switches is connected in a single hop by a global link to a single respective subset in every other set of the switches. Thus, two or more hops may be required to transmit a packet from a given subset in one set of the switches to one or more of the subsets in another set of the switches. The global links are laid out, however, so that connections (including multi-hop connections) exist between all subsets of the switches. Within each subset, switches 30 are fully connected by local links 40, as noted earlier.

Alternatively, as shown in FIG. 1, a denser layout of global links 44 may be used, providing closer connectivity among switches 30, though still with higher port utilization than in Dragonfly networks. In this case, each switch 30 in each subset 32, 34, 36 of each set 22, 24, 26, 28 is connected by global links 44 to a single switch in each of the other sets. Furthermore, each of the switches within each subset of any given set is connected to a different subset of each of the other sets. Thus, for example, in subset 32 of set 22, the rightmost switch is connected to a switch in subset 32 of set 24; the middle switch is connected to a switch in subset 34 of set 24, and the leftmost switch is connected to a switch in subset 36 of set 24. The other subsets are similarly interconnected. This topology is useful in balancing the network traffic load while supporting simple routing rules, with relatively short path lengths.

Once the network topology has been defined, a routing manager 54 (FIG. 2) defines paths for transmission of packets between each source and destination in system 20, and loads the corresponding path information into forwarding tables 52. Routing manager 54 typically comprises a programmable processor 56, with a memory 58 and an interface 60 for receiving and transmitting routing information from and to the nodes in system 20. The functions of routing manager 54 may be carried out, for example, by a general-purpose computer under the control of suitable software. This software may be downloaded to processor 56 in electronic form, for example over a network. Additionally or alternatively, the software may be stored on tangible, non-transitory computer-readable media, such as electronic, optical, or magnetic memory media.

Figure 3:
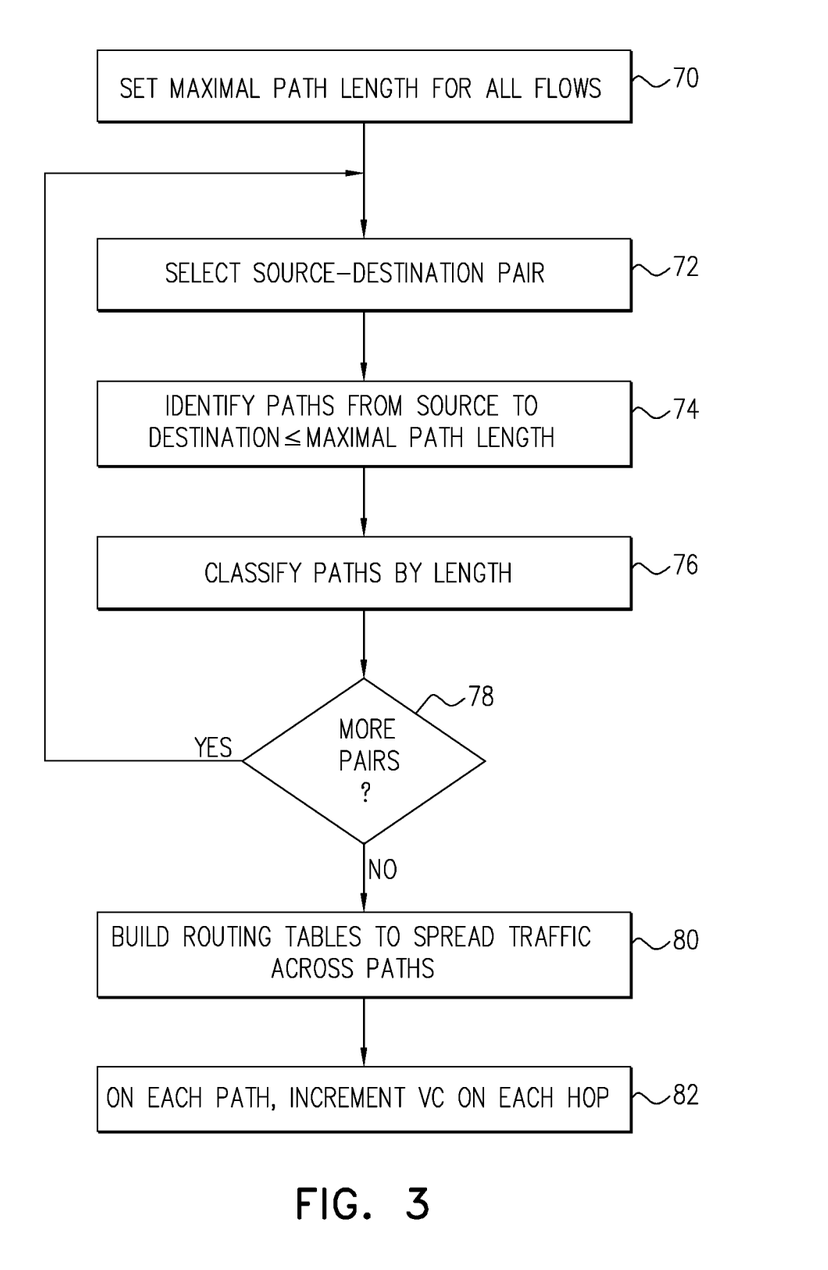
FIG. 3 is a flow chart that schematically illustrates a method for routing packets in a communication network, in accordance with an embodiment of the invention.

FIG. 3 is a flow chart that schematically illustrates a method for routing packets in a communication network, in accordance with an embodiment of the invention. For the sake of concreteness and clarity, this method is described with reference to the elements of system 20 and is carried out by routing manager 54, as shown in FIGS. 1 and 2. Alternatively, the principles of the present method may be applied advantageously in other networks in which switches are partitioned into sets and subsets as described above, such that within each subset the switches are fully connected by local links, while there are no single-hop connections between different subsets in the same set, and global links interconnect the subsets of different sets. The present method aims to spread traffic evenly over the links in the network while avoiding deadlocks that can arise, for example, when buffers fill due to a "credit loop."

Routing manager 54 sets a maximal path length for all flows that are to be routed in system 20, at a length setting step 70. This maximal path length specifies the maximal number of hops that will be permitted on any path between a source and a destination node in system 20 and is set to a value large enough to ensure that all nodes in the system are able to communicate with one another. Increasing the maximal path lengths enables more uniform spreading of traffic across the network, but at the expense of greater latency and possibly increased memory requirements in switches 30 to accommodate a larger number of virtual channels (as explained below).

Routing manager 54 selects pairs of source and destination nodes in system 20, at a pair selection step. For each pair, routing manager 54 applies a routing algorithm in order to identify all paths between the source and destination nodes having a path length that is less than or equal to the maximum, at a path identification step 74. The paths are classified by length, at a path classification step 76, from the shortest path(s) connecting the selected pair of source and destination nodes up to the maximum permitted path length. This routing procedure continues until all pairs of source and destination nodes have been covered, at a pair coverage step 78.

Based on the set of paths defined at step 76, routing manager 54 builds routing tables for all switches 30, at a routing step 80. The routing tables typically include multiple alternative paths to at least some of the destinations, thus enabling switches 30 to select the next hop for each packet adaptively, for example based on reports of network congestion. In this manner, switches 30 will distribute traffic evenly across links 40 and 44 in system 20. In building the routing tables, routing manager 54 prioritizes shorter paths while avoiding overburdening any of the links. The routing information is stored by switches 30 in respective forwarding tables 52 (FIG. 2).

In order to avoid possible deadlocks, routing manager 54 instructs switches 30 to use a different virtual channel (VC) on each hop of each of the paths in the routing tables, at a VC assignment step 82. For this purpose, for example, packets are transmitted over the first hop on each path using a default VC, which is denoted VC0. At each successive hop, the VC is incremented, meaning that the packet is transmitted using VC1 on the second hop, VC2 on the third hop, and so forth. Thus, on each hop along any given path, each VC transitions deterministically to the next VC in the sequence, and there is no VC that transitions back to VC0. The number of virtual channels (including VC0) that is required in this scheme is equal to the maximal path length that was set at step 70. The deterministic, unidirectional progression of the virtual channels along each path ensures that no credit loops will arise on any of the paths.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A data communication system, comprising:
a plurality of mutually-disjoint sets of switches, each set comprising multiple mutually-disjoint subsets of the switches in the set;
local links interconnecting the switches in each of the subsets in a fully-connected topology, such that all the switches in any given subset of any given set of the switches are connected by the local links to all other switches in the given subset, while none of the switches in the given subset are connected in a single hop to any of the switches in any other subset within the given set; and
global links interconnecting the sets of the switches, each global link connecting a respective first switch in one of the sets to a respective second switch in another one of the sets, such that each of the subsets in any given one of the sets of the switches is connected in a single hop by at least one of the global links to at least one of the subsets of every other one of the sets of the switches.

2. The system according to claim 1, wherein within each subset of the switches, a first one of the switches in the subset is connected by a first global link to a first one of the switches in a first one of the other sets, and a second one of the switches in the subset is connected by a second global link to a second one of the switches in a second one of the other sets.

3. The system according to claim 1, wherein different ones of the subsets in any given one of the sets are connected by respective ones of the global links in single hops to different, respective ones of the subsets of the other sets of the switches.

4. The system according to claim 1, wherein at least some of the subsets in any given one of the sets of the switches are not connected in a single hop by the global links to all the subsets in every other one of the sets of the switches.

5. The system according to claim 4, wherein each of the subsets in each of the sets of the switches is connected in a single hop by a respective one of the global links to a single respective one of the subsets in every other one of the sets of the switches.

6. The system according to claim 1, wherein all the subsets in each of the sets of the switches are connected in a single hop by respective ones of the global links to all the subsets in every other one of the sets of the switches.

7. The system according to claim 1, and comprising a routing manager, which is configured to define paths for transmission of packets among the switches in the system over the local and global links, wherein the paths are limited to a predefined maximal number of hops.

8. The system according to claim 7, wherein the switches are configured to transmit the packets over the paths using a number of virtual channels that is equal to the predefined maximal number of hops, while transitioning through the virtual channels in a predefined sequence on each hop of each of the paths.

9. A method for communication, comprising:
partitioning switches in a network among a plurality of mutually-disjoint sets of switches, each set comprising multiple mutually-disjoint subsets of the switches in the set;
interconnecting the switches in each of the subsets using local links in a fully-connected topology, such that all the switches in any given subset of any given set of the switches are connected by the local links to all other switches in the given subset, while none of the switches in the given subset are connected in a single hop to any of the switches in any other subset within the given set; and
interconnecting the sets of the switches using global links, such that each global link connects a respective first switch in one of the sets to a respective second switch in another one of the sets, and such that each of the subsets in any given one of the sets of the switches is connected in a single hop by at least one of the global links to at least one of the subsets of every other one of the sets of the switches.

10. The method according to claim 9, wherein interconnecting the sets of the switches comprises connecting a first one of the switches within each subset of the switches by a first global link to a first one of the switches in a first one of the other sets, and connecting a second one of the switches in the subset by a second global link to a second one of the switches in a second one of the other sets.

11. The method according to claim 9, wherein interconnecting the sets of the switches comprises connecting different ones of the subsets in any given one of the sets by respective ones of the global links in single hops to different, respective ones of the subsets of the other sets of the switches.

12. The method according to claim 9, wherein at least some of the subsets in any given one of the sets of the switches are not connected in a single hop by the global links to all the subsets in every other one of the sets of the switches.

13. The method according to claim 12, wherein interconnecting the sets of the switches comprises connecting each of the subsets in each of the sets of the switches in a single hop by a respective one of the global links to a single respective one of the subsets in every other one of the sets of the switches.

14. The method according to claim 9, wherein interconnecting the sets of the switches comprises connecting all the subsets in each of the sets of the switches in a single hop by respective ones of the global links to all the subsets in every other one of the sets of the switches.

15. The method according to claim 9, and comprising defining paths for transmission of packets among the switches in the network over the local and global links, wherein the paths are limited to a predefined maximal number of hops.

16. The method according to claim 15, and comprising transmitting the packets among the switches over the paths using a number of virtual channels that is equal to the predefined maximal number of hops, while transitioning through the virtual channels in a predefined sequence on each hop of each of the paths.

17. A data communication system, comprising:
   a plurality of mutually-disjoint sets of switches, each set comprising multiple mutually-disjoint subsets of the switches in the set;
   local links interconnecting the switches within each of the subsets in a fully-connected topology, while none of the switches in any given subset are connected in a single hop to any of the switches in any other subset within the same set; and
   global links interconnecting the sets of the switches, each global link connecting one switch in one of the sets to another switch in another one of the sets, such that each of the subsets in any given set of the switches is connected in a single hop by at least one global link to at least one of the subsets of every other set of the switches.

18. The system according to claim 17, wherein at least some of the subsets in any given one of the sets of the switches are not connected in a single hop by the global links to all the subsets in every other one of the sets of the switches.

19. The system according to claim 17, wherein all the subsets in each of the sets of the switches are connected in a single hop by respective ones of the global links to all the subsets in every other one of the sets of the switches.

20. The system according to claim 17, and comprising a routing manager, which is configured to define paths for transmission of packets among the switches in the system over the local and global links, wherein the paths are limited to a predefined maximal number of hops.

\* \* \* \* \*